(12) United States Patent
Deal

(10) Patent No.: US 6,776,426 B2
(45) Date of Patent: Aug. 17, 2004

(54) SUSPENSION DEVICE PERMITTING CAMBER

(75) Inventor: Michel Deal, St-Remy-en-Rollat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 53 days.

(21) Appl. No.: 10/117,759

(22) Filed: Apr. 4, 2002

(65) Prior Publication Data

US 2002/0171216 A1 Nov. 21, 2002

(30) Foreign Application Priority Data

Apr. 5, 2001 (FR) .............................. 01 04761
Dec. 12, 2001 (FR) .............................. 01 16169

(51) Int. Cl.$^7$ ................................. B60G 7/02
(52) U.S. Cl. ....................... 280/86.751; 280/124.138
(58) Field of Search ................. 280/124.138, 124.139, 280/124.143, 124.15, 124.106, 5.521, 86.751, 93.512

(56) References Cited

U.S. PATENT DOCUMENTS

| 4,373,743 A | * | 2/1983 | Parsons, Jr. | .......... 280/124.138 |
| 4,515,390 A | | 5/1985 | Greenberg | ................. 280/675 |
| 4,700,972 A | | 10/1987 | Young | ........................ 280/707 |
| 4,798,396 A | * | 1/1989 | Minakawa | ........... 280/124.138 |
| 4,973,076 A | * | 11/1990 | Fayard | .................... 280/5.521 |
| 5,022,673 A | * | 6/1991 | Sekino et al. | ......... 280/124.138 |
| 5,984,330 A | * | 11/1999 | Hasshi et al. | ......... 280/124.146 |
| 6,173,977 B1 | * | 1/2001 | Fun | ....................... 280/124.16 |
| 6,467,783 B1 | * | 10/2002 | Blondelet et al. | ..... 280/124.106 |

FOREIGN PATENT DOCUMENTS

| DE | 1077538 | 3/1960 |
| DE | 3205783 | 8/1983 |
| DE | 3900336 | 7/1990 |
| DE | 19717418 | 10/1998 |
| FR | 2706731 | 12/1994 |
| FR | 2721258 | 12/1995 |

* cited by examiner

*Primary Examiner*—David Dunn
(74) *Attorney, Agent, or Firm*—Fitzpatrick, Cella, Harper & Scinto

(57) ABSTRACT

The invention relates to a suspension device (1; 11) intended to connect a wheel carrier (3) to a body (5) of a vehicle, the device having means (4, 8, 9) conferring to the wheel carrier, with respect to the body, a degree of camber freedom and a degree of suspension deflection freedom substantially independent of one another. The said means comprises an intermediate support (4) linking the wheel carrier to the body, the intermediate support being, on the one hand, articulated with respect to the body along a substantially vertical first axis (ASI) and, on the other hand, articulated to the wheel carrier along a second axis (R1R2), so that a rotation of the intermediate support about the first axis permits the degree of camber freedom.

14 Claims, 15 Drawing Sheets

SUSPENSION DEVICE PERMITTING CAMBER

BACKGROUND OF THE INVENTION

1. Technical Field of the Invention

The present invention relates to chassis systems for vehicles, more particularly to suspension devices for vehicles, and still more particularly to suspension devices which allow wheel camber control substantially independently of the vertical oscillations of the wheel.

2. The Related Art

Vehicular suspension devices have two main functions which must be fulfilled simultaneously at any moment during operation. One of these functions is that of suspending the vehicle, that is to say, permitting substantially vertical oscillations of each wheel in accordance with the load applied to the wheel. The other function of these devices is that of guiding the wheel, that is to say, controlling the angular position of the wheel plane.

The term "wheel plane" refers to the plane, associated with the wheel, which is perpendicular to the axis of the wheel and which passes through the center of the contact area with the ground. The angular position of the wheel plane with respect to the body of the vehicle is defined by two angles, the camber angle and the steering angle. The camber angle of a wheel is the angle separating, in a transverse plane perpendicular to the ground, the wheel plane from the mid-plane of the vehicle. This angle is positive when the upper part of the wheel deviates from the mid-plane towards the outside of the vehicle, this being commonly termed "camber" or "positive camber". Conversely, when this angle is negative, the term used is "counter-camber" or "negative camber". The steering angle of a wheel is the angle separating, in a horizontal plane parallel to the ground, the wheel plane from the mid-plane of the vehicle.

On most vehicles, the camber angle ("camber" or "camber angle" will be used without distinction hereinbelow) is fixed for a particular position of the suspension and the steering; that is to say, theoretically it cannot vary independently of the suspension deflection or the steering. However, it undergoes variations induced by the deformations of the elements constituting the suspension device caused by the forces exerted on the wheel by the ground. These variations may be considerable. For example, an ordinary passenger car experiences camber variations of several degrees under the transverse forces developed on the tire on a curve, irrespective of the contribution of the roll of the vehicle body (which generally tilts in the same direction under the effect of centrifugal force). This "elastic" variation of the camber causes the camber to increase (the camber tends towards positive values) for the outer wheel on the curve. Conversely, the camber decreases (it tends towards negative values) for the inner wheel on the curve. For a long time, these predictable variations have been incorporated into the design and adjustment compromises of the suspension devices for such ordinary vehicles in order to limit the harmful effects which they have on the functioning of the chassis system.

The camber has a great influence on the behavior of the vehicle and the performance of the chassis system. In particular, the performance of a tire is very variable depending on the configuration of its area of contact with the ground, and this configuration depends largely on the camber. The choice of the static camber angle is based mainly on these variations. Thus, for example, a large negative static camber is generally introduced on a racing vehicle in order to compensate for the variations due to the deformations of the tire under transverse force, as well as the suspension elements, even though they are much more rigid than on passenger cars, and due to the roll of the body. This configuration is both useful and acceptable in racing, since the criteria of grip on cornering are a major concern here. In contrast, on a passenger car, since the wear of the tires and the straight-line stability have more weight in the compromise being sought, a very slightly negative initial static camber is generally chosen. It is necessary to accept reduced slip thrusts, mainly on curves, when the effects of deformations of the tire and the elements of the ground contact system under the lateral forces on the positioning of the wheel plane are added to the effects of the roll of the vehicle.

In order to optimize the camber, in particular during transverse accelerations, suspension devices whose camber varies in accordance with the vertical deflection of the wheel have been designed. In this way, the roll experienced by the body of the vehicle can induce a useful variation of the camber which partly or totally compensates for the inclination of the body of the vehicle and the deformations described above. This is the case of the so-called "multi-link" systems. These devices require a specific design and vehicle architecture, which cannot be implemented on most current vehicles, for reasons of space requirements and cost. These systems react only to the consequence (deflection, rolling) of a transverse acceleration and not to the forces which cause it, thereby, on the one hand, delaying the effect of the correction. Moreover, to permit a sufficient variation of the camber, the kinematics of these systems require displacements of the position of the contact area with respect to the vehicle, called "track changes", and these variations can also create difficulty. The range of camber corrections made possible by such systems is therefore relatively limited when the compromise necessary for correct functioning of the other load cases, such as travelling on a bumpy road, unilateral or in contrast simultaneous bouncing, is to be observed.

From the point of view of kinematics, in terms of degrees of freedom, suspension devices generally have only one degree of freedom (of the wheel or wheel carrier with respect to the vehicle). This degree of freedom permits vertical suspension movements which, as explained above, can be combined with limited camber variations.

Systems are known, however, in which the control of the camber is active; that is to say, the geometry modifications are controlled by movements of actuating cylinders, as described, for example, in the patent documents U.S. Pat. No. 4,515,390, U.S. Pat. No. 4,700,972 and DE 19717418. In these systems, at least a certain degree of additional freedom controlled by actuators has been permitted. These systems are very specific, since they cannot be used in most ordinary vehicles, in particular because of their space requirement, the considerable power necessary for the actuators and for costs reasons.

SUMMARY OF THE INVENTION

An object of the invention is to provide a suspension device of simple construction, which allows control of the camber substantially independently of the vertical oscillations of the suspension device and, more generally, of the movements of the body of the vehicle.

The foregoing and other objects of the invention are attained by a suspension device intended to connect a wheel carrier to a body of a vehicle, such device having means conferring to the wheel carrier, with respect to the body, a degree of camber freedom and a degree of suspension deflection freedom independent of one another. The means includes an intermediate support linking the wheel carrier to the body, the intermediate support being, on the one hand, articulated with respect to the body along a substantially vertical first axis and, on the other hand, articulated to the wheel carrier along a second axis, so that a rotation of the intermediate support about the first axis permits the degree of camber freedom. The suspension device of the invention has two degrees of freedom permitting independent suspension and camber movements. The camber movement is effected in a simple manner by virtue of the rotation of the intermediate support about a substantially vertical first axis. "Substantially vertical" means in this context that the axis of rotation can be inclined, for example up to an inclination of 30° from vertical as will be seen from the detailed description of the drawings.

Preferably, with the wheel carrier being intended to carry a wheel of radius 'r' and the wheel being intended to rest on the ground by way of its contact area, the suspension device is configured so that the camber movement of the wheel carrier with respect to the body allows, about a mean position, a first instantaneous center of rotation situated in a range of from 2.5 r above the ground to r below the ground, and preferably in a range from r above the ground to r below the ground. The fact that the camber movement is effected about an instantaneous center of rotation situated at a limited distance from the contact area makes it possible to limit the track changes during cambering or counter-cambering and also to limit the supply of energy necessary in the case of active control of the camber.

In a preferred embodiment, the first instantaneous center of rotation is situated in a range of from 0.2 r above the ground to 0.4 r below the ground.

In order to ensure stable functioning, the suspension device is preferably configured so that it is close to the equilibrium in the aforementioned mean position in the absence of transverse force exerted by the ground on the wheel in the contact area and also preferably configured so that, in the absence of camber variations, the transverse force exerted by the ground on the wheel in the contact area generated in the course of the suspension deflection does not exceed a reasonable limit compared to the weight of the vehicle. These conditions are preferably achieved by virtue of a suspension device in which the camber movement of the wheel carrier with respect to the first axis allows, about the mean position, a second instantaneous center of rotation situated substantially in the plane of the wheel. More preferably, the position, relatively to the wheel center, of the second instantaneous center of rotation forms an angle of less than 15°, preferably less than 5°, with the wheel plane.

To permit passive functioning, the first instantaneous center of rotation can preferably be situated below the plane of the ground, so that transverse forces exerted by the ground on the wheel in the contact area induce an inclination of the wheel carrier with respect to the body towards decreasing camber, when the transverse forces are directed towards the inside of the vehicle, and towards increasing camber, when the said transverse forces are directed towards the outside of the vehicle. In this passive functioning case, linked to the transverse forces, the suspension device can have means for measuring the angular displacement of the intermediate support to deduce the transverse forces therefrom.

The transverse forces which act on the wheel in the contact area originate mainly from the transverse acceleration acting on the vehicle travelling on a curve. The same acceleration applies substantially in the same way on each element of the vehicle, in particular on all the elements making up the chassis system. In particular, the wheel and its associated parts tend to lean towards the outside of the curve. This obviously has to be reckoned with when designing the device. However, this effect can also be profited from in the context of the present invention if it is made useful for the camber variation. This is possible if, for example, the mass of the intermediate support is positioned in relation to its axis of rotation in such a way that the centrifugal force which acts on its center of mass generates a torque which tends to rotate the intermediate support in the desired direction, that is to say, towards the desired camber change for such a transverse acceleration. In that case, the effect of transverse acceleration is used (at least partially) to help achieve the desired camber change. Hence, this effect can allow the provision of a suspension device in accordance with the invention, in which the first instantaneous center of rotation is closer to the ground level but which passive camber behavior is still satisfactory.

Preferably, the intermediate support is linked to the wheel carrier so that the steering is substantially independent of the camber and the suspension device can further have means for controlling the steering. Steering is generally considered independent of camber if a given camber variation (for example 5°) induces a steering variation of less than 10% of the given camber variation (for example 0.4°).

In certain conditions, it may be necessary or beneficial further to provide control means capable of influencing the camber of the wheel. These means can comprise an elastically deformable element opposing the camber movement, the deformable element being comprised of, for example, elastomeric articulations.

The invention also relates to a device intended to connect, in addition, an opposite wheel carrier belonging to the same axle as the wheel carrier.

Finally, the invention relates to a vehicle equipped with such a suspension device.

Several embodiments of the invention will be described in order to illustrate the features and explain the principles thereof. Naturally, other embodiments of the invention are possible, as suggested by the numerous variants.

DETAILED DESCRIPTION OF EXEMPLARY EMBODIMENTS OF THE INVENTION

Figure 1:
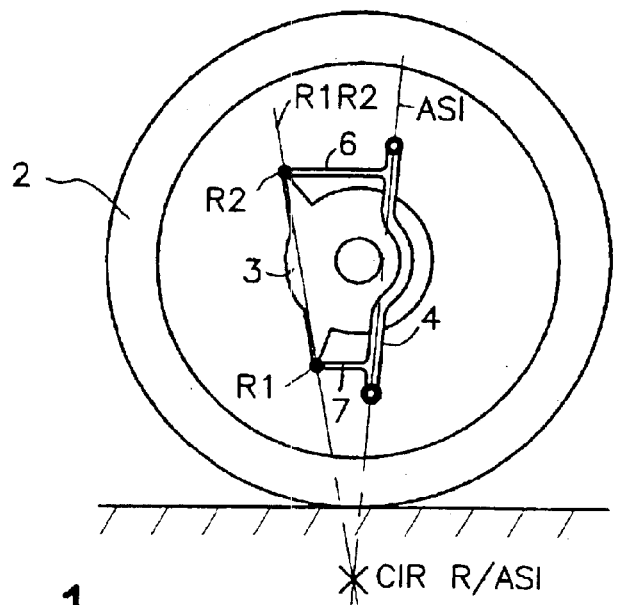
FIG. 1 is a partial side view along the axis of the wheel of an embodiment according to the invention.

FIG. 1 is a view along the axis of the wheel 2. An intermediate support 4 is articulated with respect to the suspension elements 8 and 9 (visible in FIG. 2) along a first axis ASI. The wheel carrier 3, which carries the axis of the wheel in a rigid manner, is articulated on the intermediate support 4 along a second axis R1R2, via support elements 6 and 7. This type of double hinge makes it possible to define, about a mean position, a rotation of the wheel carrier 3 in the vertical plane containing the axis of the wheel (that is to say the plane of FIG. 2, in which plane the camber movement is effected). This rotation corresponds to a camber movement of the wheel and is effected about the point (CIR R/ASI) common to the axis R1R2 and the axis ASI. In the case where these two axes are not coplanar, the camber movement may be considered as being effected about a point situated in the middle of the shortest segment joining these two axes in space.

Figure 2:
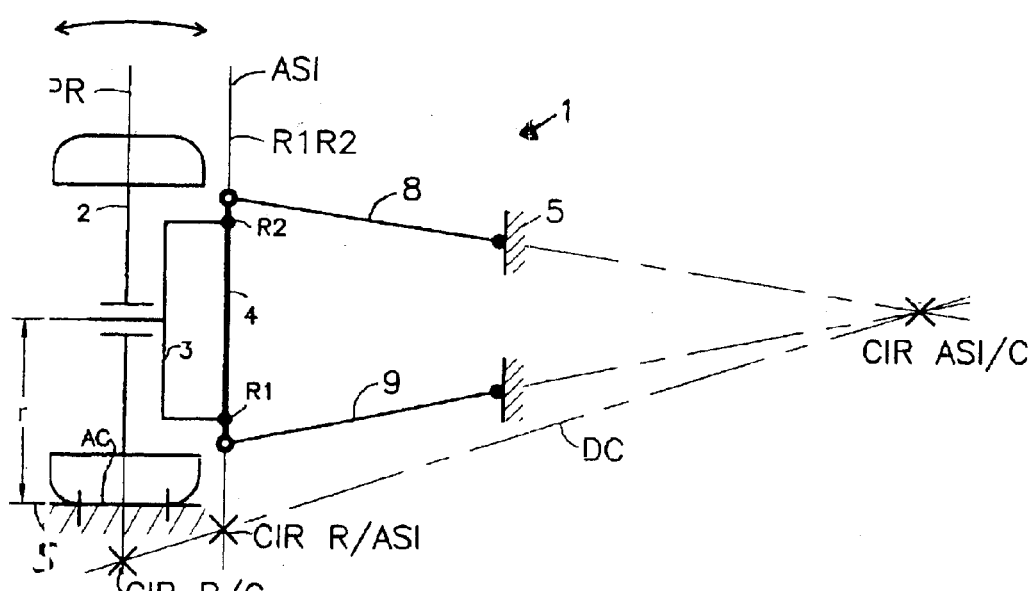
FIG. 2 is a diagram of the kinematic functioning of the embodiment of FIG. 1 seen along the longitudinal axis of the vehicle.

FIG. 2 shows, in a view along the longitudinal axis of the vehicle, the principle of a suspension device according to the invention. This plane representation (that is to say, in two dimensions) is very convenient, since it shows clearly how the device according to the invention differs from the devices of the state of the art. The suspension device 1 comprises a wheel carrier 3 intended to maintain the plane PR of a wheel 2 with respect to the body 5 of a vehicle. The wheel of radius "r" is resting on the ground S by way of its contact area AC. The independent camber movement of the wheel is permitted by a double articulation of the wheel carrier 3 with respect to the suspension arms (or wishbones) 8 and 9. The axes R1R2 and ASI of this double articulation (see also FIG. 1) are superimposed in this view. The suspension deflection movement is permitted by linking the intermediate support 4 to the body 5 by the upper arm 8 and the lower arm 9. Thus, the suspension device 1 is configured so as to confer to the wheel carrier, with respect to the body 5, a degree of camber freedom, since the wheel carrier 3 is able to tilt with respect to the body, as well as a degree of suspension deflection freedom, since the wheel carrier 3 is able to effect substantially vertical movements in a manner known per se, for example in the manner of "multi-link" systems.

By accepting the customary hypothesis of a point contact in the plane PR of the wheel 2 on the ground S, the theory of the colinearity of the instantaneous centers of rotation in a plane movement makes it possible to situate the first instantaneous center of rotation (CIR R/C) of the camber movement of the wheel carrier 3 with respect to the body 5 at the intersection of the wheel plane PR and of the straight line (DC) carrying the second instantaneous center of rotation (CIR R/ASI) of the movement of the wheel carrier 3 with respect to the axis (ASI) of the intermediate support and the third instantaneous center of rotation (CIR ASI/C) of the movement of the axis (ASI) of the intermediate support 4 with respect to the body 5. This kinematic reasoning is commonly employed in the field of the chassis system. It is understood then that it is the choice of the configuration, that is to say, the dimensions and orientation of the various elements constituting the suspension device, which (by defining the positions of the characteristic axes of the suspension elements) makes it possible to obtain a desired position of the first instantaneous center of rotation (CIR R/C) of the camber movement. FIG. 2 shows the suspension device in a mean position, which could be defined as the position corresponding to travelling in a straight line on a flat ground, the vehicle carrying its nominal load. This diagram shows an example of zero static camber.

Figure 3:
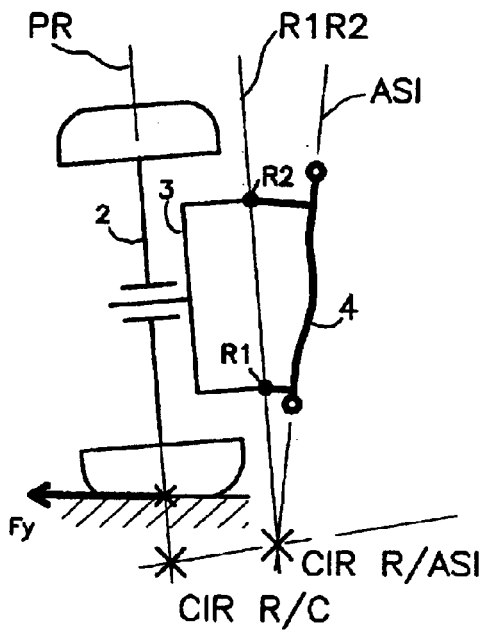
FIGS. 3 and 4 are two views similar to FIG. 2, showing the embodiment in two different positions.
Figure 4:
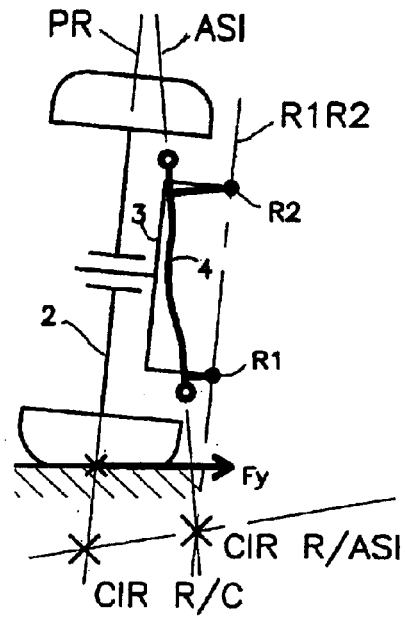

FIGS. 3 and 4 show the camber kinematics of the device of the preceding figures, omitting the suspension arms 8 and 9. Thus, these figures show diagrammatically how the wheel 2 and the wheel carrier 3 tilt towards the outside (FIG. 3) or towards the inside (FIG. 4) of the vehicle by virtue of the rotation of the intermediate support 4 about its first axis (ASI) and the rotation of the wheel carrier 3 with respect to the intermediate support 4 about the second axis R1R2. Two movements are shown here: the movement of the axis ASI, which is linked to the body by known suspension means (not shown, see FIG. 2), and the movement of the wheel plane PR with respect to the axis ASI. In practice, FIG. 3 may correspond to the situation of a left-hand wheel of a vehicle travelling around a left-hand curve. The forces Fy exerted by the ground S on the wheel 2 are therefore oriented towards the outside of the vehicle (towards the left of the figure). These forces Fy cause the wheel and the wheel carrier to rotate in the direction of positive camber (the camber angle increases). However, the body of the vehicle generally experiences roll towards the outside of the curve, that is to say towards the right of FIG. 3, as shown by the inclination of the axis ASI.

In contrast, FIG. 4 may correspond to the situation of a left-hand wheel of a vehicle travelling around a right-hand curve. The forces Fy exerted by the ground S on the wheel 2 are therefore oriented towards the inside of the vehicle (towards the right of the figure) and cause the wheel and the wheel carrier 3 to rotate in the direction of negative camber (the camber angle decreases), while the body of the vehicle generally experiences roll towards the outside of the curve, that is to say towards the left of FIG. 4, as shown by the orientation of the axis ASI. This behavior is made possible by virtue of the fact that the first instantaneous center of rotation of the camber movement (CIR R/C) is situated below the plane of the ground S. When this point is situated above the plane of the ground, the transverse forces (Fy) have, of course, an opposite effect on the behavior of the system. In this case, it is necessary to "force" the system by using an actuator (for example, an actuating cylinder) to control the relative movements of the wheel carrier 3 and of the intermediate support 4.

Figure 5:
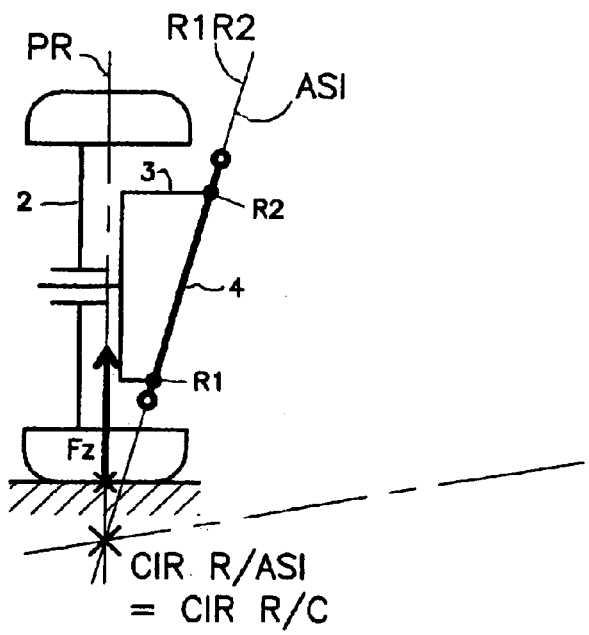
FIG. 5 is a view similar to FIG. 2 of a preferred embodiment of the invention.

FIG. 5 shows a special configuration of the device of the invention as described in the preceding figures. The special feature lies in the fact that the first axis ASI of the intermediate support 4 intersects the second axis R1R2 substantially in the wheel plane PR. Thus, the second instantaneous center of rotation (CIR R/ASI) of the movement of the wheel carrier 3 with respect to the axis ASI and the first instantaneous center of rotation (CIR R/C) of the camber movement of the wheel carrier 3 with respect to the body coincide. This makes it possible to render the behavior in terms of camber substantially independent of the vertical load Fz carried by the wheel. This configuration exhibits a perfectly stable equilibrium, that is to say, even in the absence of stiffness at the articulations (as is the case for mechanical ball joints), the device is in equilibrium in its mean position in the absence of transverse force Fy exerted by the ground on the wheel in the contact area. In practice, in view of the manufacturing tolerances and the various deformable elements such as the tire, a configuration close to the equilibrium is satisfactory in terms of functioning. When the position, with respect to the center of the wheel, of the second instantaneous center of rotation (CIR R/ASI) forms an angle less than 15°, more preferably less than 5°, with the plane of the wheel, this condition can be satisfied.

Figure 1A:
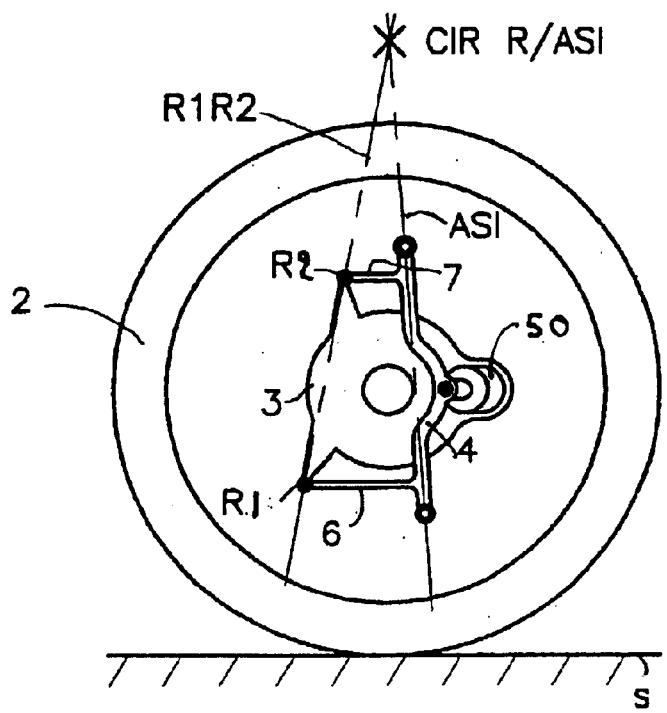
FIGS. 1a, 2a, 4a, 5a are views similar to those of FIGS. 1, 2, 4 and 5 of different embodiments of the invention.
Figure 2A:
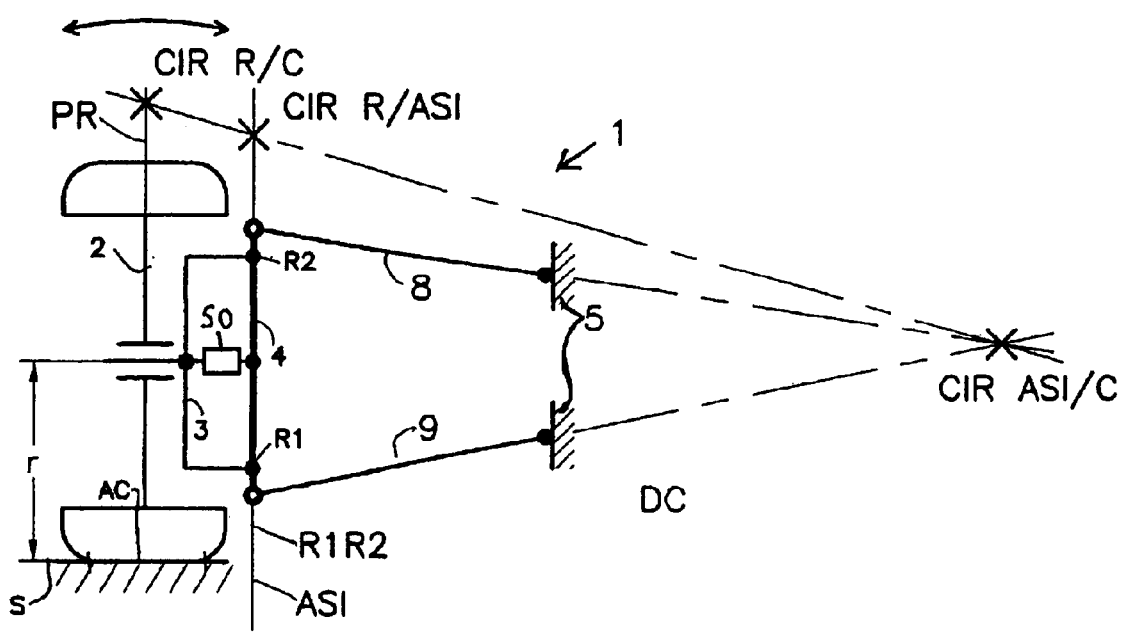
Figure 4A:
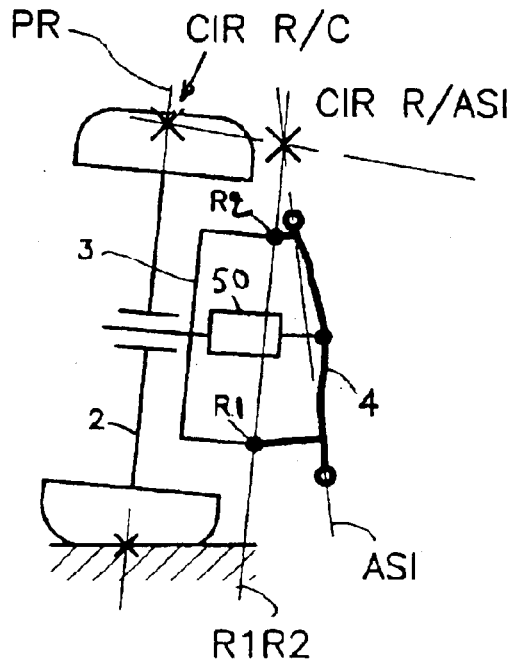

FIGS. 1a, 2a and 4a show a configuration differing from the suspension device of FIGS. 1, 2 and 4 in a manner permitting a clear graphical comparison. The system is configured so that the camber movement takes place about a point situated in the top part of the wheel plane PR. Using the same principles as set out above, the position of the instantaneous center of rotation of the camber movement of the wheel 2 with respect to the body 5 (CIR R/C) can be determined. Owing to the fact that this point is now situated above the ground, the system has to have an active control means, since the "natural" camber caused by the transverse forces (Fy) is not oriented in the desired direction. In contrast, an active control means such as an actuating cylinder 50 makes it possible to impose the camber adapted to the travelling situation of the vehicle. The active control means 50 preferably acts between the intermediate support 4 and the wheel carrier 3, as shown in the figures.

Figure 5A:
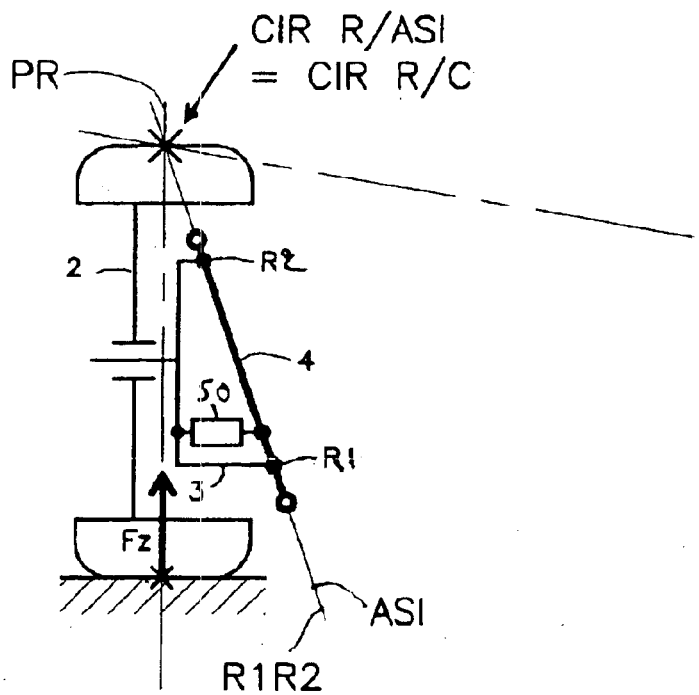

FIG. 5a is equivalent to FIG. 5 for an active configuration close to that of FIG. 1a, 2a and 4a. The first axis ASI of the intermediate support 4 intersects the second axis R1R2 substantially in the wheel plane PR. Thus, the second instantaneous center of rotation (CIR R/ASI) of the movement of the wheel carrier 3 with respect to the axis ASI and the first instantaneous center of rotation (CIR R/C) of the camber movement of the wheel carrier 3 with respect to the body coincide (in the mean position shown here). This configuration exhibits equilibrium, but this equilibrium is unstable here. Advantages of this configuration are, on the one hand, the absence of force on the active control means 50 in the mean position in the absence of transverse force exerted on the wheel and, on the other hand, greater insensitivity to the variation of the load (Fz) carried by the wheel.

Figure 6:
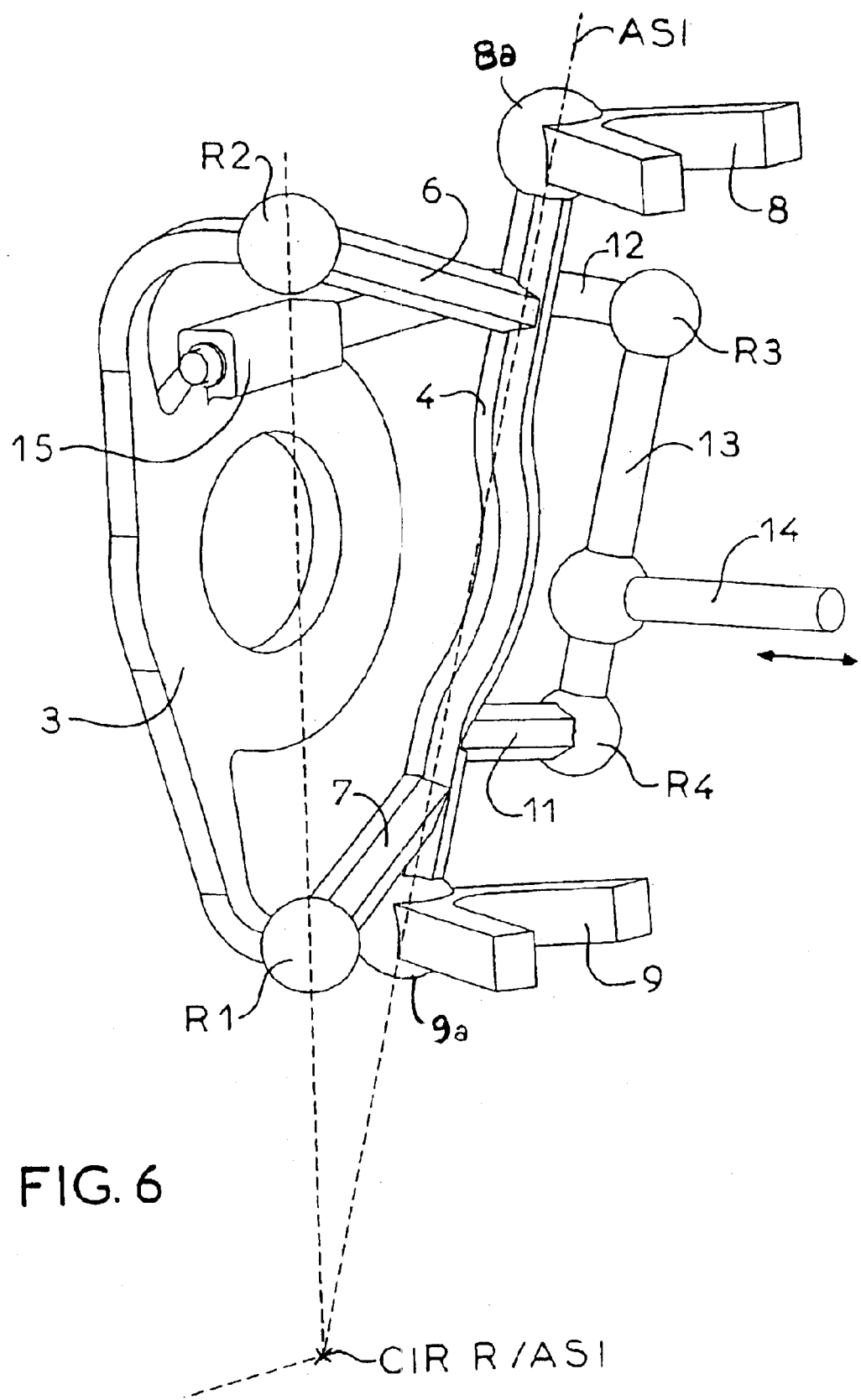
FIGS. 6 and 7 are two perspective views of a second embodiment of the invention.
Figure 7:
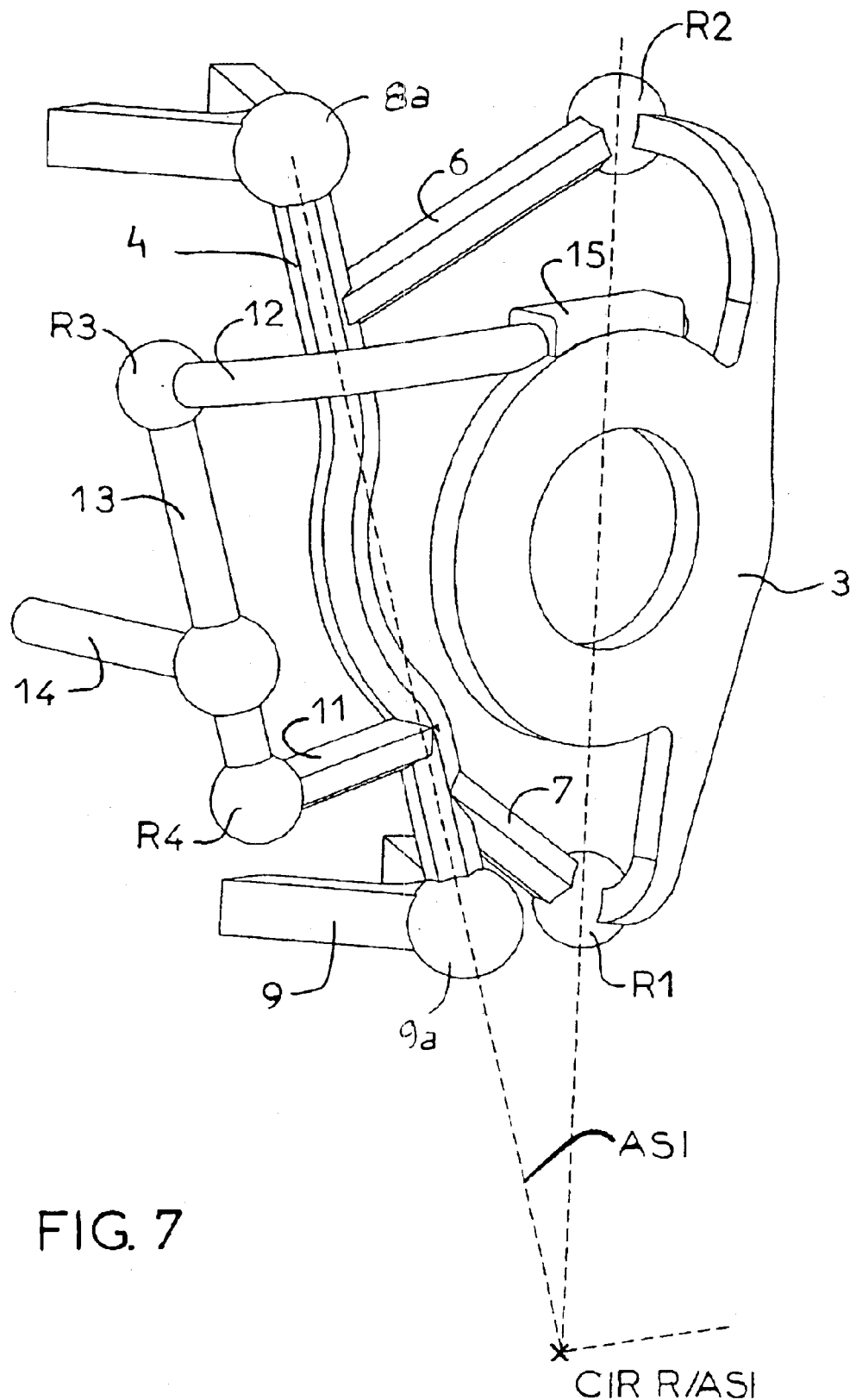

FIGS. 6 and 7 show an embodiment of the suspension device of the invention. In this example, the suspension deflection movement is provided by a double-wishbone system, known per se, comprising an upper wishbone 8 and a lower wishbone 9. As before, the axis ASI is embodied by the ball joints 8a and 9a linking the wishbones 8 and 9 to the intermediate support 4. The wheel carrier 3 is articulated to the intermediate support 4, via support elements 6 and 7, along the axis R1R2 defined here by the position of the ball joints R1 and R2. This non-sliding pivot link can also be provided by a plain bearing having axial stops or a pair of tapered rolling bearings, for example. The axis R1R2 intersects the axis ASI to define the second center (CIR R/ASI) of rotation of the movement of the wheel carrier 3 with respect to the axis ASI of the intermediate support 4 in the camber plane. The steering of the wheel is controlled by a steering rod 14. So that the camber variations do not influence the steering, the steering rod 14 is not connected directly to the wheel carrier 3 but to a rocker 13. One end of the rocker 13 is connected to the intermediate support 4 by way of an arm 11. The other end is linked to the wheel carrier 3 by way of a pivoting arm 12 for accommodating the geometrical variations due to the camber movement. The position of the steering rod 14 on the rocker 13 may be chosen, in contrast, so that the steering influences the camber insofar as that may be desired.

One can visualize in FIG. 7 the centrifugal effect which has been described above. In this example, the intermediate support 4 rotates about its first axis ASI to allow the wheel carrier 3 a degree of camber freedom. The spreading of mass of intermediate support 4 can be such that the centrifugal force acting on the support generates a torque which helps achieve the desired camber change. For example, if we consider that FIG. 7 represents the suspension device of a right-hand wheel of a vehicle travelling along a left-hand curve, the desired effect is such a rotation of the intermediate support 4 that ball joints R1 and R2 swing towards the inside of the vehicle and that ball joint R4 swings towards the outside. To achieve such an effect, it is necessary that the center of mass of the intermediate support 4 be located, relative to the axis ASI, on the side of ball joint R4. One can, for instance, artificially add mass to the ball joint R4.

Figure 8B:
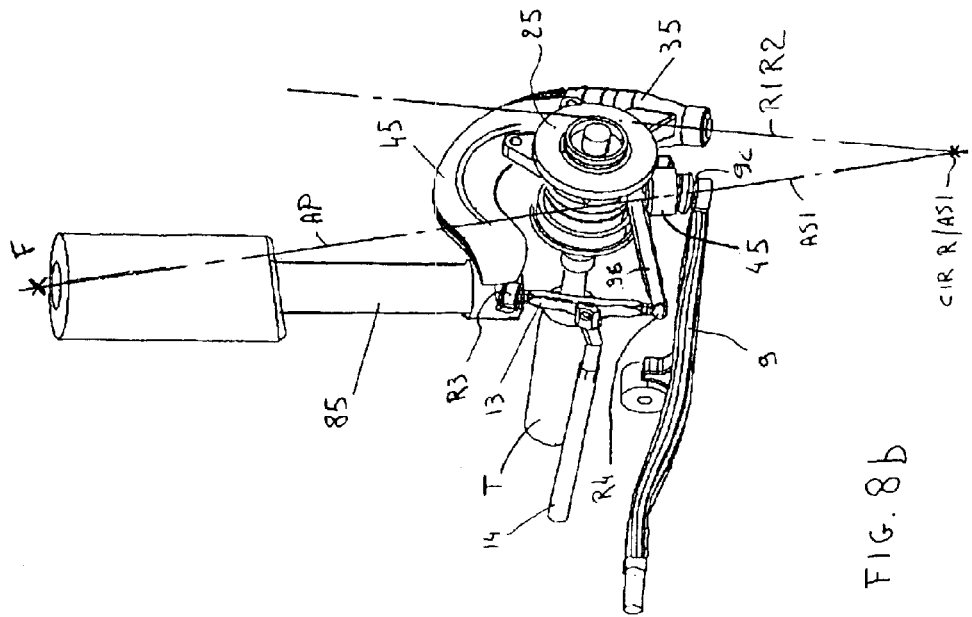
FIG. 8b is a perspective view of a variant of the third embodiment.
Figure 8A:
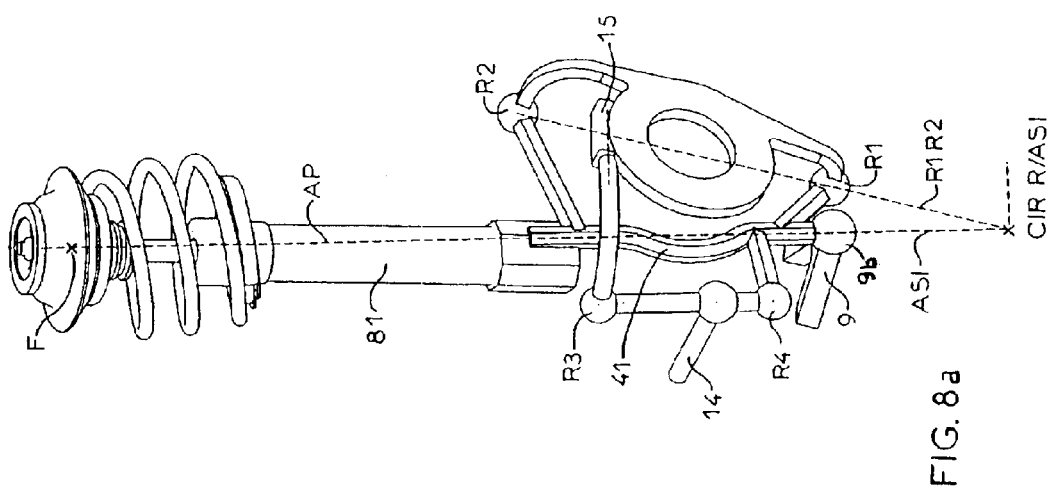
FIG. 8a is a perspective view of a third embodiment.

FIG. 8a shows another embodiment of the suspension device of the invention. In this example, the suspension deflection movement is provided by a MacPherson strut. The intermediate support 41 is integral with the lower part of the strut 81. The axis of rotation (ASI) of the intermediate support 41 is defined by the position of the ball joint 9b which links it to the lower wishbone 9 and by the position of the point F of articulation of the upper part of the strut 81 with respect to the body. Thus, the same pivot is used for the steering according to the MacPherson principle and for the articulation of the intermediate support 41. The rest of the device is identical to that which is described in FIGS. 6 and 7, in particular as far as the second axis R1R2 and the mechanism for controlling the steering by the steering rod 14 are concerned.

FIG. 8b shows a variant of the device of FIG. 8a. The intermediate support 45 is integral with the lower part of the strut 85. As in FIG. 8a, the axis of rotation (ASI) of the intermediate support 45 is defined by the position of the ball joint 9c which links it to the lower wishbone 9 and by the position of the point F of articulation of the upper part of the strut 85 with respect to the body. The pivot link materialized by ball joints R1 and R2 in FIG. 8 is materialized here by an axial pivot (R1R2) which links the wheel carrier 35 to the intermediate support 45 in the same way as described in FIG. 11. FIG. 8b shows also a transmission beam T as well as a wheel hub 25. The mechanism for controlling the steering by the steering rod 14 is similar to that of FIG. 8a, except that the upper ball joint R3 of the rocker 13 is connected onto the strut 85 and the lower ball joint R4 is connected to an arm 36 of the hub carrier 35.

Figure 9:
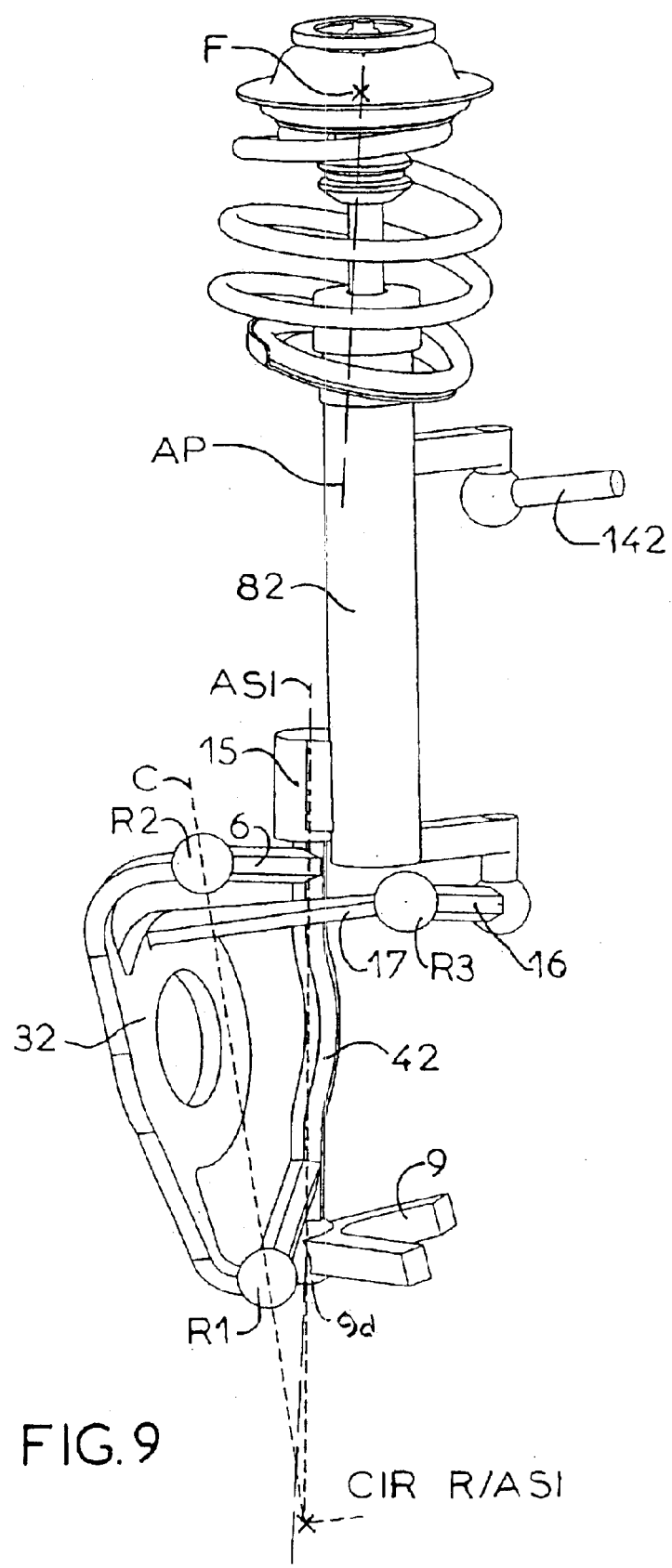
FIG. 9 is a perspective view of a fourth embodiment.

FIG. 9 shows another embodiment of the suspension device of the invention based on a MacPherson system. The main difference from the device of FIG. 8a is that the intermediate support 42 is articulated with respect to the strut 82 by a non-sliding pivot link 15. Thus, the first axis ASI of rotation of the intermediate support 42 is distinct from the steering pivot axis AP defined in a known manner for a MacPherson system by the positions of the point F of linkage to the body and of the ball joint 9d linking the lower wishbone 9 to the intermediate support 42. These two axes can be completely distinct, relatively close (as in the example of FIG. 9) or coincident, depending on the desired effects. The second axis R1R2 intersects the first axis ASI to define the second instantaneous center of rotation (CIR R/ASI) of the wheel carrier 32 with respect to the intermediate support 42 in the camber plane. To make it possible to steer the vehicle, in a manner known per se, the orientation of the strut 82 is controlled by way of the steering rod 142. This rotational movement about the pivot axis is transmitted to the wheel carrier 32 by virtue of a connecting rod 16 acting on an arm 17 of the wheel carrier. In this way, the steering angle is little affected by the camber variations about the mean position. Alternatively, the connecting rod 16 can be directly connected to the tie-rod if the movement of the tie-rod is substantially along the axis of the connecting rod 16. This is the case in particular for the longitudinal tie-rods of numerous heavy vehicles.

Figure 10:
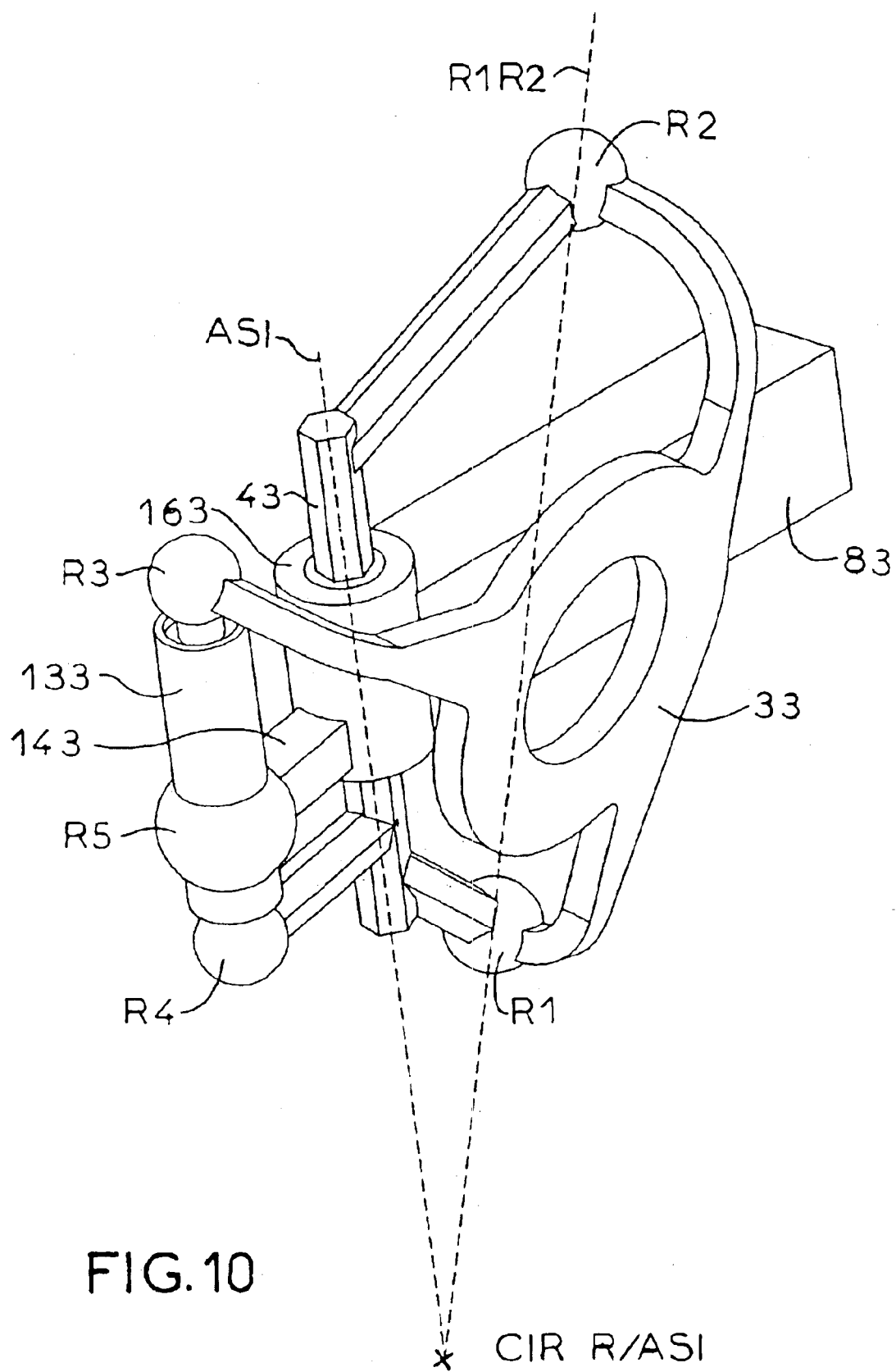
FIG. 10 is a perspective view of a fifth embodiment.

FIG. 10 shows the application of the invention within context of a suspension with swing arms (pulled or pushed). The intermediate support 43 is articulated on the swing arm 83 by a pivot link 163 so as to be able to turn along the axis ASI. The wheel carrier 33 is linked to the intermediate support 43 by the ball joints R1 and R2 arranged so as to define the axis R1R2. The intermediate support 43 is furthermore linked by a ball joint R4 to one end of the rocker 133. The other end of the rocker is linked to the wheel carrier 33 by the ball joint R3. Since the rocker 133 is also linked by, a ball joint R5 fixed to the swing arm 83, the steering of the wheel is controlled independently of the camber generated by the rotation of the intermediate support 43. In order to permit the variations of distance between the ball joints R3 and R4 in the course of the camber movements of the device, the rocker 133 is telescopic in this embodiment. This means, therefore, performs the same function as the pivot link (15) of FIGS. 6, 7, 8a and 8b. As in the examples described above, the movement of the wheel carrier in the camber plane is, about a mean position, a rotational movement whose center (CIR R/ASI) is the intersection of the axes ASI and R1R2 if they are coplanar or a point situated in the middle of the shortest segment joining these two axes if they are not coplanar.

Figure 11:
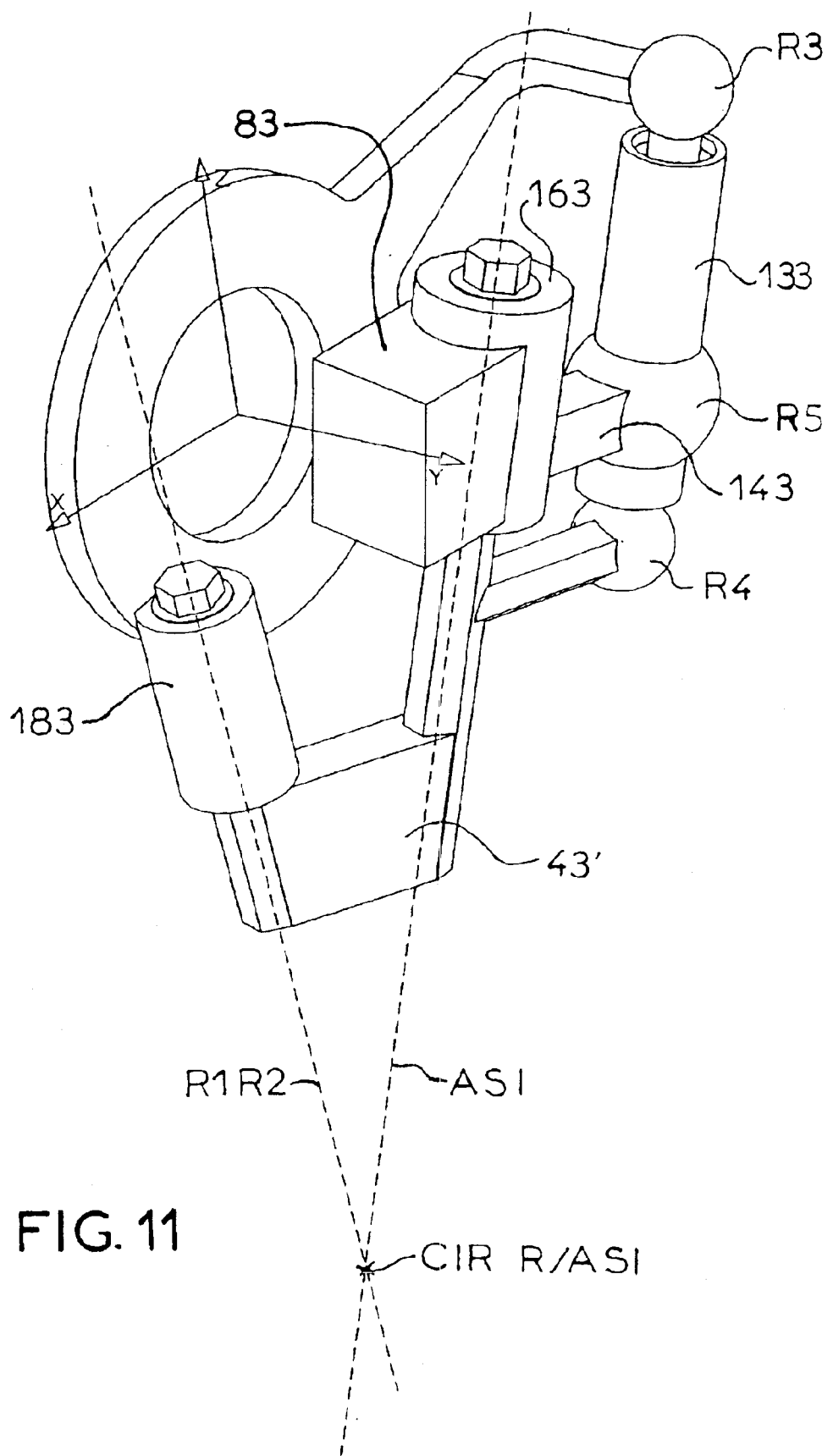
FIG. 11 is a perspective view of a variant of the fifth embodiment.

FIG. 11 shows a view (in an orientation opposite to that of FIG. 10) of an equivalent device in which the ball joints R1 and R2 are replaced by a non-sliding pivot link 183 which embodies the same second axis R1R2. The intermediate support 43' has a 'V' shape, the legs pivoting with respect to the elements which they connect. The rest of the device is identical to that of FIG. 10. Although functionally equivalent, it can be seen that this embodiment may exhibit different features in terms, for example, of space requirement and robustness. Alternatively, in the place of the steering control system shown here, one can use the principle shown in FIG. 9. The connecting rod (16 in FIG. 9) can in this case be substantially parallel to the swing arm 83. Such a combination may be particularly beneficial from the point of view of simplicity and compactness of the whole device.

Figure 12:
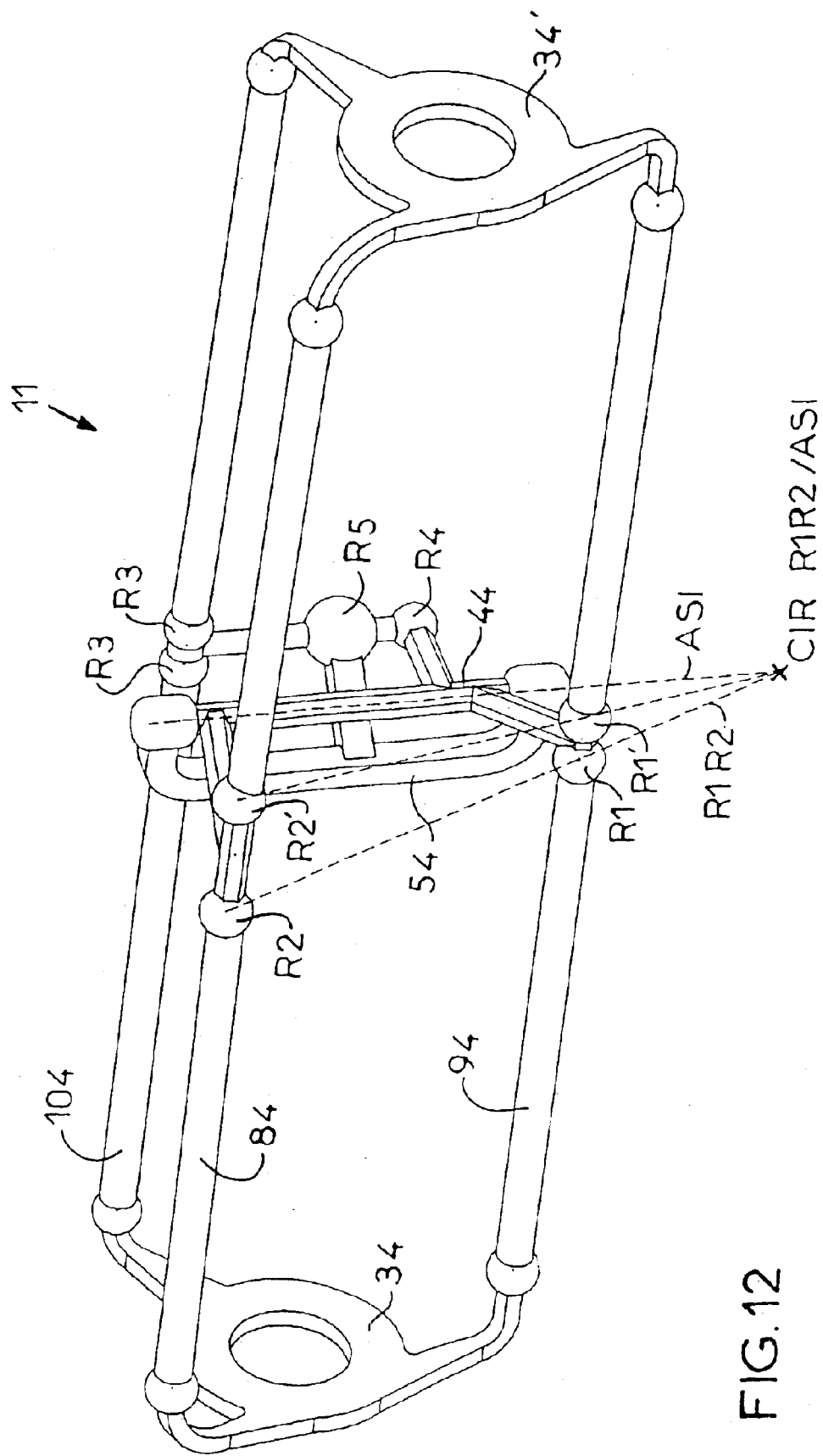
FIG. 12 is a perspective view of a sixth embodiment.

FIG. 12 shows the application of the principle of the invention to the control of the camber of the two wheels of the same axle, as described in the commonly owned U.S. patent application Ser. No. 09/617,892. The device 11 according to the invention is then intended to connect in addition an opposite wheel carrier 34' belonging to the same axle as the wheel carrier 34. The intermediate support is articulated, along a substantially vertical first axis ASI, with respect to the body of the vehicle, directly or by way of an element such as a support 54 integral with the car body. The wheel carrier 34 is linked by an upper suspension arm 84 and a lower suspension arm 94 to the ball joints R2 and R1, respectively, of the intermediate support 44. The links controlling the longitudinal position and the rotation of the wheel carrier are not shown here. There may be a longitudinal arm which is quite customary in this field of "multi-link" axles, provided, of course, that it allows the camber movement of the wheel carrier. The steering is controlled in this example in a manner similar to FIGS. 10 and 11. The opposite wheel carrier 34' is linked symmetrically to that which has just been described for the wheel carrier 34. The ball joints R1, R2 and R3 may coincide respectively with the opposite ball joints R1', R2' and R3'. They are shown here, in contrast, separated.

Figure 13:
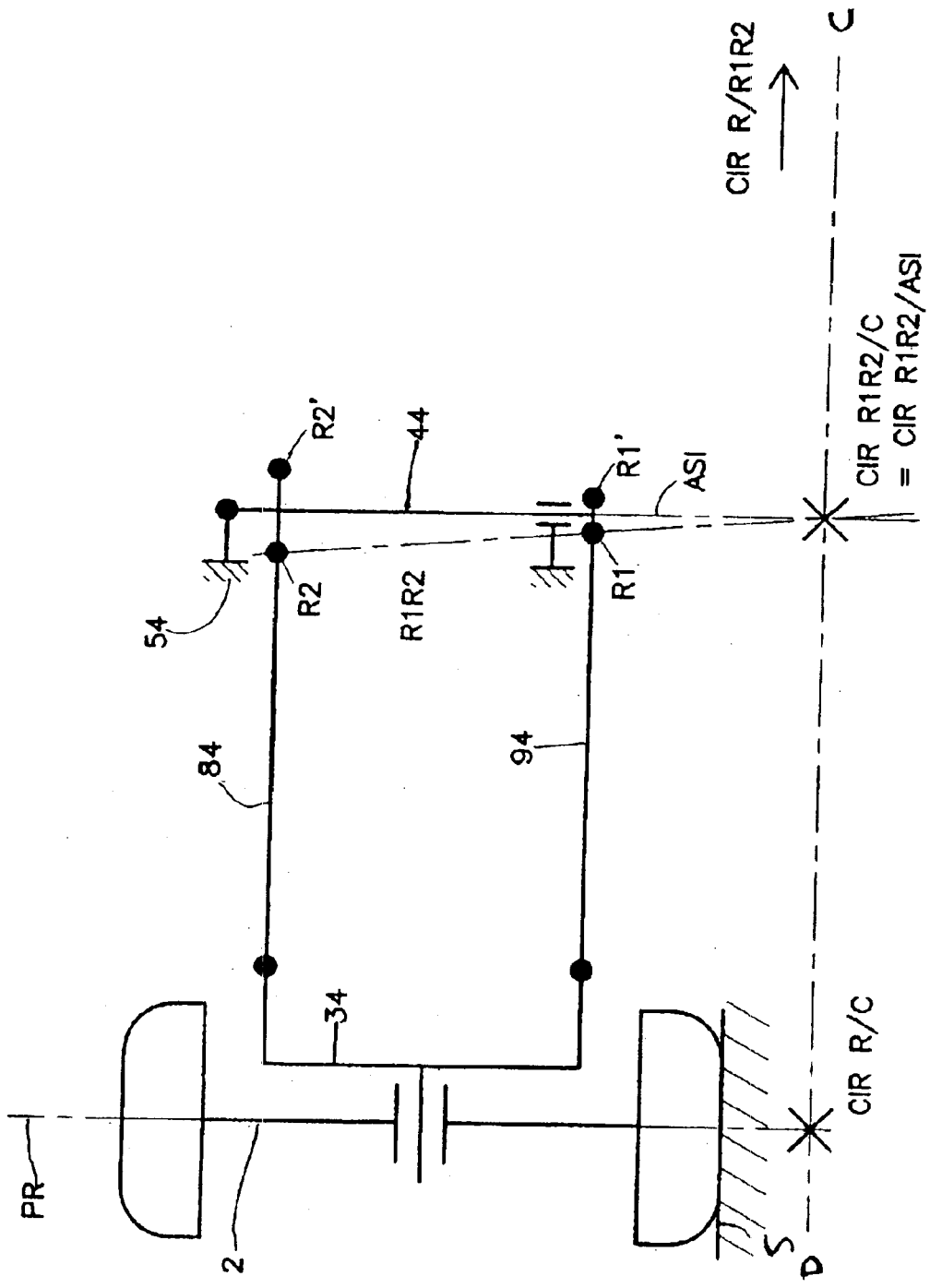
FIG. 13 is a diagram of the kinematic functioning of the sixth embodiment of the invention seen along the axis of the vehicle.

For a clear understanding of the functioning of the axle of FIG. 12, FIG. 13 shows, using the same type of diagram as FIG. 2, the kinematic reasoning which governs the camber of the wheel carrier 34. The suspension deflection movement is permitted by linking the wheel carrier 34 to the intermediate support 44 by the upper arm 84 and the lower arm 94. The independent camber movement of the wheel is permitted by a rotation of the intermediate support 44 with respect to the body or the support 54. Thus, the suspension device is configured so as to confer to the wheel carrier 34, with respect to the body, a degree of camber freedom, since the wheel carrier 34 is able to tilt with respect to the body, and a degree of suspension deflection freedom, since the wheel carrier 34 is able to effect substantially vertical movements in a manner known per se, for example in the manner of "multi-link" systems.

By accepting the customary hypothesis of a point contact in the plane PR of the wheel 2 on the ground S, the theory of the colinearity of the instantaneous centers of rotation in a plane movement makes it possible to situate the first instantaneous center of rotation (CIR R/C) of the camber movement of the wheel carrier 34 with respect to the body 54 at the intersection of the wheel plane PR and of the straight line (DC) carrying the other two instantaneous centers of rotation, that of the movement of the axis R1R2 of the linkage of the arms 84 and 94 to the intermediate support 44 with respect to the body (CIR R1R2/C) and that of the movement of the wheel carrier 34 with respect to the axis R1R2 of the intermediate support (CIR R/R1R2). This kinematic reasoning is analogous to that of the description of FIG. 2. The example illustrated here is specific: on the one hand, the instantaneous center of rotation (CIR R/R1R2) of the movement of the wheel carrier 34 with respect to the axis R1R2 is situated, in this example, at an infinite distance owing to the parallelism of the arms 84 and 94 and, on the other hand, the straight line DC is shown horizontal, since the arms are themselves shown horizontal. It is understood that it is the choice of the configuration, that is to say, the dimensions and orientation of the various elements constituting the suspension device, which (by defining the positions of the characteristic axes of the suspension elements) makes it possible to obtain a desired position of the first instantaneous center of rotation (CIR R/C) of the camber movement. FIG. 13 shows the suspension device in a mean position, which could be defined as the position corresponding to travelling in a straight line on a flat ground, the vehicle carrying its nominal load. This diagram shows an example of zero static camber.

Figure 13A:
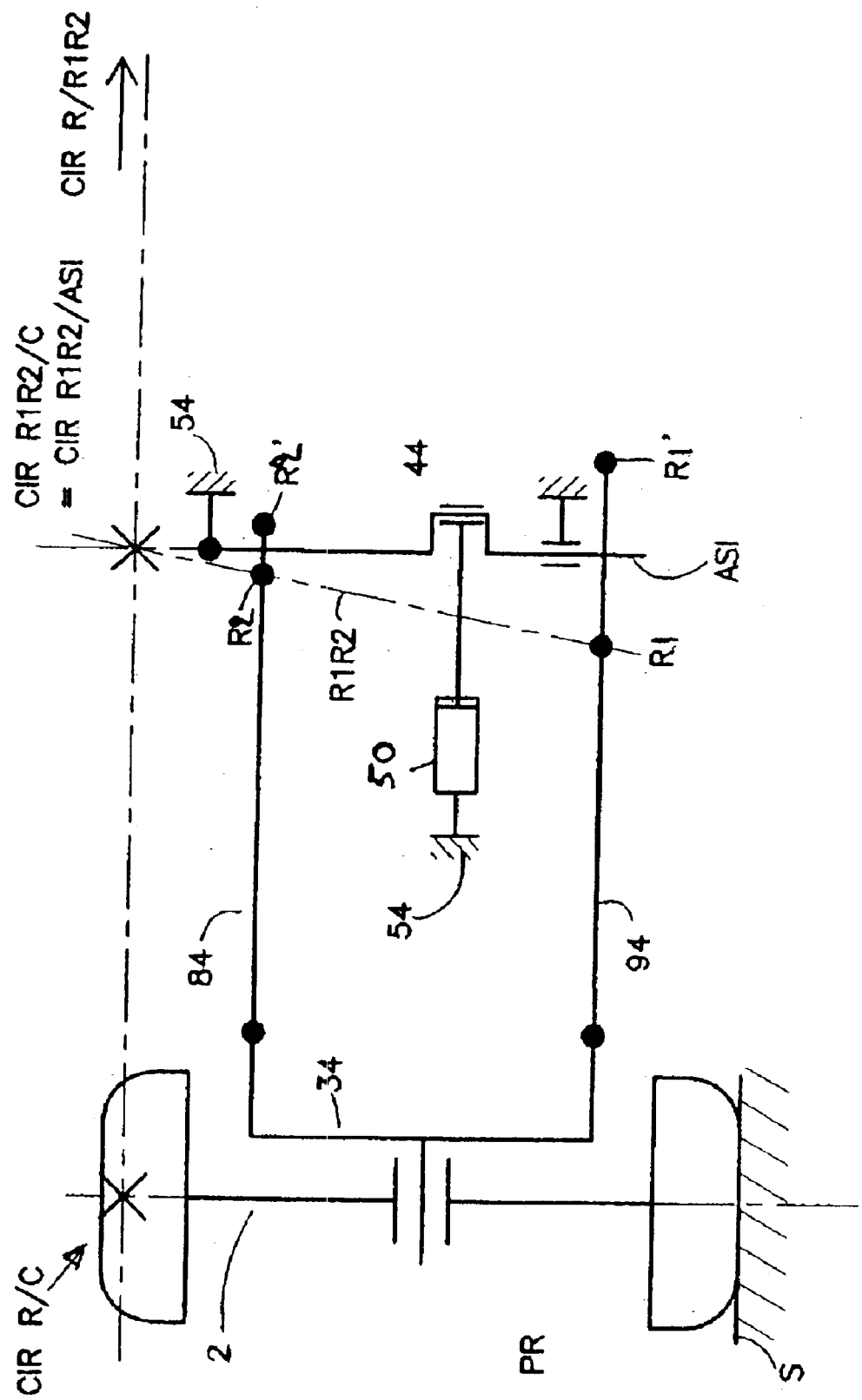
FIG. 13a is a diagram of the kinematic functioning of another version of the sixth embodiment of the invention seen along the axis of the vehicle.

FIG. 13a shows, in accordance with the diagram of FIG. 13, a different configuration. This configuration, in which the instantaneous center of rotation (CIR R/C) of the camber movement of the wheel 2 with respect to the body 54 is situated in the top part of the wheel plane PR, is comparable to that of FIG. 2a for example. As explained above in the case of the examples of FIGS. 1a, 2a, 4a and 5a, the use of an active control means is necessary for the desired camber to be obtained. For this, an actuating cylinder 50 acting for example between the intermediate support 44 and the car body or a support 54 integral with the body.

Figure 14:
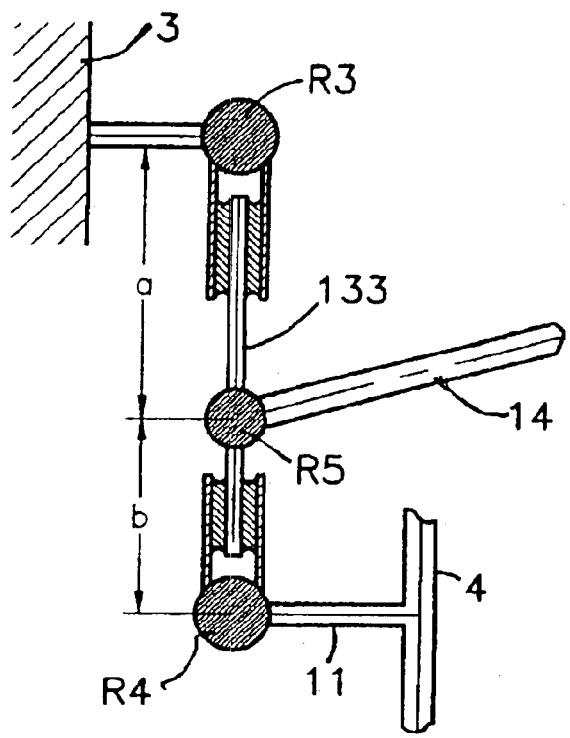
FIG. 14 is a basic diagram of a first embodiment of the steering rocker.
Figure 15:
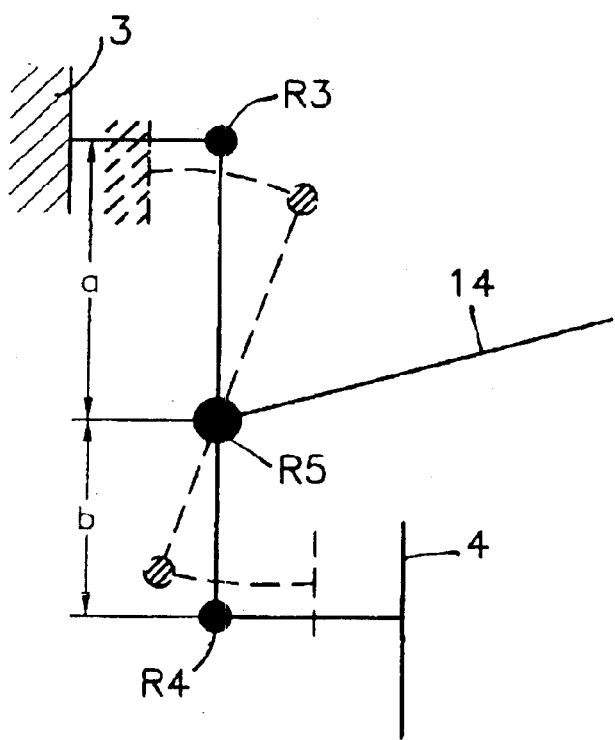
FIG. 15 is a basic diagram of a second embodiment of the steering rocker.

FIGS. 14 and 15 show embodiments of the steering rocker illustrated in FIGS. 10 to 12. The function of such a rocker is to permit the variation of the distance between the ball joints R3 and R4 during the camber variations while maintaining a predetermined ratio between the distances a and b respectively separating the ball joints R3 and R4 from the ball joint R5 which receives the steering rod 14. FIG. 14 shows a solution based on the fact that the rocker is telescopic by virtue of the elastomeric connections between the ball joints R3 and R4 and the rocker 133. FIG. 15 shows a solution based on the elasticity of the linking arms. If they are designed to be in equilibrium about the mean position, these two elastic means can have a camber spring function acting against the variations about this mean position. It is understood that the behavior of the suspension device can be influenced by simply modifying the stiffness in the direction desired. Moreover, the proportion between the segments a and b may be different (or become different during camber variations) from the proportion which gives perfect independence between the steering and the camber.

Figure 16:
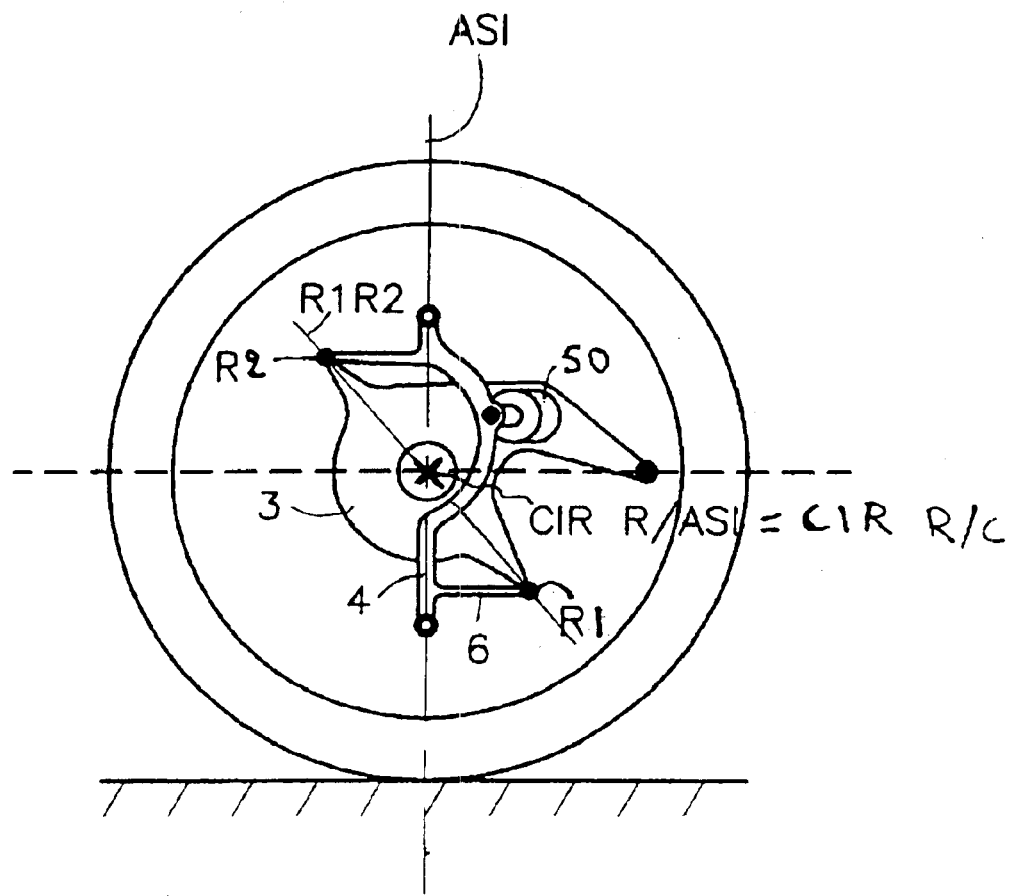
FIG. 16 is a view similar to FIG. 1 of a further variant of the invention.

FIG. 16 shows a variant "halfway" between the configurations of FIGS. 1 and 1a. The first instantaneous center of rotation (CIR R/C), that is to say the intersection of first (ASI) and second (R1R2) axes, is situated here at the center of the wheel 2. This illustrates the fact that the principle of the invention makes it possible to choose the position of this point within a large range. This specific configuration may be particularly beneficial with regard to the functioning of a possible transmission (not shown), since the camber movement of the wheel plane does not involve any transverse displacement of the center of the wheel with respect to the body here. The camber movement takes place about an horizontal axis represented by an horizontal dashed line on FIG. 16. For this reason, the tie-rod can be connected directly to the wheel carrier 3, provided this connection is roughly on the horizontal line to avoid camber changes having any influence on steering.

An advantage common to the "active" configurations of FIGS. 1a, 2a, 4a, 5a and 13a is a reduced space requirement around the upper part of the wheel during the camber deflection. This is because, in the examples of these figures, the rotation of the wheel plane is effected about a point (CIR R/C) situated in the vicinity of or even in the section of the upper part of the wheel 2. Thus, during cambering, the upper part of the wheel 2 is virtually not displaced with respect to the body and, where appropriate, the wing or the wheel housing of the vehicle body. Only the vertical deflection of the suspension then has to be taken into account in the design of the body. Another advantage of these configurations concerns the half-track change during the camber movements. If, in a situation such as a right-hand curve (as shown in FIG. 4a, but the same reasoning applies also to the configurations of FIGS. 13a and 16), the actuating cylinder 50 imposes a negative camber on the wheel 2, this camber movement taking place about a point (CIR R/C) situated at the top of the wheel 2, the bottom of the wheel (and therefore the contact area) is pushed (with respect to the body 5) towards the outside of the curve. This corresponds to what is called a positive half-track change. This feature may be advantageous for the stability of the behavior of the vehicle, and it has the advantage of combating the load transfer by displacement of the center of gravity of the body 5 towards the inside of the curve. Thus, the overload of the outer wheel compared with the inner wheel on the curve is reduced. This is a positive factor for the overall grip potential of the axle.

As all the figures show, numerous variants are possible. Most of the known suspension systems are capable of accommodating the device of the invention, since it entails adding to them a degree of camber freedom. Similarly, the various versions of the steering control means are generally interchangeable. Thus, a large number of different combinations can be envisaged depending on the specificities of the vehicle concerned and the desired performance.

As has been seen, depending on the desired functioning, a position of the first instantaneous center of rotation of the degree of camber freedom (CIR R/C) is preferably chosen in a range going from r above the ground to r below the ground (r being the radius of the wheel). The fact that this point is positioned near to the ground makes it possible to limit the track change. For example, in the case of a first instantaneous center of rotation situated at r from the ground and for a wheel of 300 mm radius, a camber of 5° causes the contact area to shift with respect to the body (half-track change) by about 25 mm. It has been found that this value must be considered as a limit not to be exceeded. However, when the first instantaneous center of rotation of the degree of camber freedom (CIR R/C) is situated above the ground, that is to say, the device of the invention must have an actuator in order to actively control the camber of the wheel plane (see the description of FIGS. 3 and 4 above), experiments have shown that, beyond a certain height, the power necessary for such active functioning makes the system too energy-consuming. This limiting height has proved to correspond substantially to a wheel radius. It is also advantageous in terms of energy required and track change for the position of the first instantaneous center of rotation (CIR R/C) of the degree of camber freedom to be situated at the level of the ground S or above this level but at a smaller distance, for example a distance corresponding to 0.1 r.

In contrast, if the energy criterion is not a major concern, it may be preferred to employ the invention in the kinematic conditions described in FIGS. 1a, 2a, 4a, 5a or 13a. In this case, the instantaneous center of rotation (CIR R/C) is advantageously situated in a range from r to 2.5 r above the ground, preferably between 1.5 r and 2 r, so as to permit a minimum space requirement under the wings of the vehicle.

It will be understood that, depending on the relative importance of the various criteria, a compromise between the space requirement, the energy required and the mechanical design constraints may be found, and that such compromise will correspond to a certain height of the instantaneous center of rotation (CIR R/C) of the camber movement of the wheel with respect to the body in the described range from r below the ground to 2.5 r above the ground.

In the case of passive functioning as described above, a method of checking the functioning of the device of the invention (and measuring its sensitivity) is to exert a series of transverse forces (with the aid, for example, of a ball plate) at the contact area of the wheel of a vehicle equipped with the device of the invention and to measure the variation of the camber angle.

In contrast, the control means may have a passive role for regulating the camber movements caused, for example, by the transverse forces, as explained by FIGS. 3 and 4.

Whether active or passive, the control means, if controllable, can be controlled in accordance with a variety of vehicle travelling parameters (for example speed, longitudinal or transverse acceleration, steering wheel position, steering wheel rotational speed, torque exerted on the steering wheel, roll, rate of roll, acceleration of roll, yaw, rate of yaw, acceleration of yaw, forces on the wheels including the vertical load, type of driving or handling desired by the driver).

In a similar construction, the control means may comprise a means for measuring the camber movements. In the case of camber movements caused by the transverse forces, this measurement makes it possible, by methods known per se, to establish these forces. Similarly, in the configurations using an active control means, it is possible, in a manner known per se, to measure the force transmitted by the active control means and to deduce therefrom the transverse forces exerted on the wheel in the contact area. This information is useful, for example, for controlling safety systems or systems for regulating the handling of the vehicle, and naturally for controlling the active control means where appropriate.

The various examples of the figures illustrate the fact that the suspension device of the invention may be realized from very different suspension principles, provided that the desired kinematic definition is obtained. In particular, the elements which are shown in arbitrary forms may take any suitable form which makes it possible to position the points and the characteristic axes appropriately, and naturally to withstand the stresses of suspension. Similarly, the figures show cases where the articulation of the wheel carrier is a "virtual" articulation about the second instantaneous center of rotation (CIR R/ASI), that is to say, it is not embodied at this point by a mechanical axis but results from the articulation of a plurality of elements. The fact that this articulation is virtual makes it possible to position the center of the rotation at any point of the plane, and in particular in the vicinity of the ground or even below the ground.

Most of the figures show the principles of the invention in projection onto a plane orthogonal to the ground and transverse to the vehicle, passing through the point of application of the resultant of the forces in the contact area. This representation in two dimensions is advantageous for clearly illustrating the main features of the device of the invention, the object of which is a controlled variation of the camber. In this representation, the camber movement is a rotation in the plane about a pivot point (instantaneous center of rotation). However, it must not be forgotten that a rotation is effected in reality (in three dimensions) about a real or virtual pivot axis (instantaneous axis of rotation). This axis is represented by a point in the plane representation. This axis may be constructed substantially parallel to the plane of the ground and to the longitudinal axis of the vehicle to permit the intended camber variations. However, by varying the orientation of this axis, it is possible to create additional steering, toe-in, toe-out or running effects depending on the transverse forces (curve) and longitudinal forces (braking, acceleration) to which the wheel is subjected in the contact area. A person skilled in the art is able, by performing tests and/or by theoretical methods, to determine the orientation which should be employed depending on the behavior expected of this device. Experiments have shown, for example, that a 6° inclination of the pivot axis with respect to the horizontal makes it possible to induce steering, linked to the camber, at an angle 10 times less than that of the camber. Thus, when the transverse forces induce a camber of 5°, the steering is about 0.5°. The inclination of the pivot axis can be obtained for example by equipping the vehicle with a device inclined by 6° with respect to the vertical.

The articulations of the various elements of the suspension device of the invention can be realized in a variety of ways. The elastomeric articulations commonly used in the field of the ground contact system may make it possible to simplify the establishment of the equilibrium of the system, since they introduce stiffness. On the other hand, it is known that they promote the comfort of the vehicle.

The control means (shown diagrammatically in the figures by a telescopic actuating cylinder 50) may take a variety of forms. For example, it is possible to employ equally telescopic or rotary, hydraulic or electrical actuating cylinders, linear motors, screw systems driven by electric or hydraulic motors or automatically controlled asynchronous electric motors. Naturally, the various types of control means may be freely combined with the various possible configurations of the device of the invention, although for a variety of reasons, such as cost or robustness, some of these combinations are particularly advantageous.

The device of the invention may be employed in order to compensate for deformations of the elements of the suspension system of current vehicles and to permit better performance. That is to say, the device of the invention may be employed to guarantee that the wheel plane remains, in all circumstances, substantially orthogonal to the plane of the ground or slightly inclined so as also to take account of the possible deformation of the tire. This aim is achieved by a device of the invention with a useful camber range of only a few degrees (for example, 8° on either side of the mean position). However, the device of the invention may also be employed in order to permit a much greater variation of the camber; that is to say, to permit a functioning of the chassis which is closer to that of a motorcycle than that of vehicles with three or more wheels currently on the market.

In order to facilitate comprehension of FIGS. 6 to 12, each main element of the device is shown with specific section. This is an aid for the reader and certainly does not indicate a preferred design. In practice, the various parts may have any form compatible with the kinematic principles described and the forces which they are intended to transmit.

In general, the figures show a wheel 2 having a pneumatic tire, but the invention naturally applies to any type of wheel with or without elastic, pneumatic or non-pneumatic tire, an essential feature being the position of the first instantaneous center of rotation with respect to the contact area, whatever it may be.

What is claimed is:

1. In a suspension device for connecting a wheel carrier to a body of a vehicle, the device having means for conferring to the wheel carrier, with respect to the body, a degree of camber freedom and a degree of suspension deflection freedom substantially independent of one another, wherein the improvement in the means comprises:
   an intermediate support linking the wheel carrier to the body, the intermediate support being articulated with respect to the body along a substantially vertical first axis (ASI) and articulated to the wheel carrier along a second axis (R1R2), so that a rotation of the intermediate support about the first axis produces a change in a camber angle of the wheel carrier.

2. The suspension device according to claim 1, wherein the intermediate support is linked to the wheel carrier so that the steering is substantially independent of the camber.

3. The suspension device according to claim 1, further having means for controlling the steering.

4. The suspension device according to claim 1, further having control means for influencing the camber of the wheel.

5. The suspension device according to claim 4, wherein the control means comprises an actuator.

6. The suspension device according to claim 4, wherein the control means comprises an elastically deformable element opposing the camber movements.

7. The suspension device according to claim 6, wherein the elastically deformable element comprises elastomeric articulations.

8. The suspension device according to claim 1, further including means for connecting an opposite wheel carrier belonging to the same axle as the wheel carrier.

9. In a suspension device for connecting a wheel carrier to a body of a vehicle, the device having means for conferring to the wheel carrier, with respect to the body, a degree of camber freedom and a degree of suspension deflection freedom substantially independent of one another, wherein the improvement in the means comprises:

an intermediate support linking the wheel carrier to the body, the intermediate support being articulated with respect to the body along a substantially vertical first axis (ASI) and articulated to the wheel carrier along a second axis (R1R2), so that a rotation of the intermediate support about the first axis permits the decree of camber freedom, wherein the wheel carrier is intended to carry a wheel of radius 'r' and the wheel is intended to rest on the ground (S), and wherein the device is configured so that the camber movement of the wheel carrier with respect to the body allows, about a mean position, a first instantaneous center of rotation (CIR R/C) situated in a range from substantially 2.5 r above the ground to substantially r below the ground.

10. The suspension device according to claim 9, wherein the first instantaneous center of rotation (CIR R/C) is situated in the range from substantially r above the ground to substantially r below the ground.

11. The suspension device according to claim 9, wherein the first instantaneous center of rotation (CIR R/C) is situated in a range from substantially 0.2 r above the ground to substantially 0.4 r below the ground.

12. The suspension device according to claim 9, wherein the wheel is intended to rest on the ground (S) by way of a contact area (AC), configured so that the device is close to the equilibrium in the mean position in the absence of transverse force (Fy) exerted by the ground on the wheel in the contact area.

13. The suspension device according to claim 9, wherein the camber movement of the wheel carrier with respect to the first axis (ASI) allows, about the mean position, a second instantaneous center of rotation (CIR R/ASI) situated substantially in the plane of the wheel (PR).

14. The suspension device according to claim 9, wherein the first instantaneous center of rotation (CIR R/C) is situated below the plane of the ground (S), so that transverse forces (Fy) exerted by the ground on the wheel (2) in the contact area (AC) induce an inclination of the wheel carrier with respect to the body towards decreasing camber when the transverse forces are directed towards the inside of the vehicle and towards increasing camber when the transverse forces are directed towards the outside of the vehicle.

* * * * *

UNITED STATES PATENT AND TRADEMARK OFFICE
CERTIFICATE OF CORRECTION

PATENT NO. : 6,776,426 B2
DATED : August 17, 2004
INVENTOR(S) : Michel Deal

It is certified that error appears in the above-identified patent and that said Letters Patent is hereby corrected as shown below:

Column 15,
Line 18, "decree" should read -- degree --.

Signed and Sealed this

Third Day of January, 2006

JON W. DUDAS
*Director of the United States Patent and Trademark Office*